May 9, 1961 M. H. McFADDEN 2,983,880

OSCILLATORS

Filed April 13, 1959 3 Sheets-Sheet 1

Inventor
Maurice H. McFadden
By Cushman, Darby & Cushman
Attorneys

May 9, 1961

M. H. McFADDEN 2,983,880

OSCILLATORS

Filed April 13, 1959

3 Sheets-Sheet 2

Inventor
Maurice H. McFadden
By Cushman, Darby & Cushman
Attorneys

Inventor
Maurice H. McFadden
By Cushman, Darby & Cushman
Attorneys

United States Patent Office 2,983,880
Patented May 9, 1961

2,983,880

OSCILLATORS

Maurice H. McFadden, Belfast, Northern Ireland, assignor to Short Brothers & Harland Limited, Belfast, Northern Ireland Filed Apr. 13, 1959, Ser. No. 805,877

14 Claims. (Cl. 331—136)

This invention relates to low frequency oscillators of the type comprising three direct coupled (D.C.) amplifiers connected in a closed circuit, the first amplifier being an adder and the second and third amplifiers being integrators, preferably of equal time constant. The object of the invention is to provide an oscillator of this type, the output of which contains an extremely low D.C. component and a minimum of harmonics and which remains substantially constant in amplitude over long periods.

The invention accordingly provides an oscillator of the above type which oscillates with a loop gain of unity and comprising, for the purpose of stabilizing the amplitude of the output, a feed back path providing negative damping and another feed back path through a dead zone unit which provides positive damping.

According to a feature of the invention the oscillator comprises at least one decade switch for varying the values of the input resistors to the integrators and thereby the frequency of oscillation of the oscillator.

Figure 1:
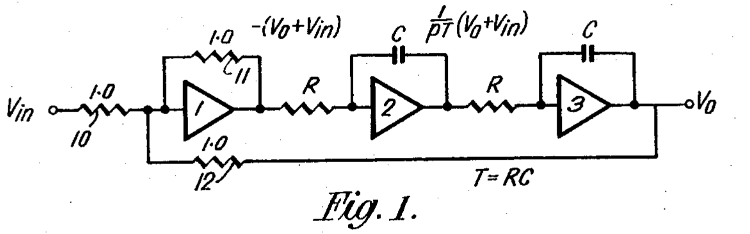
Figure 2:
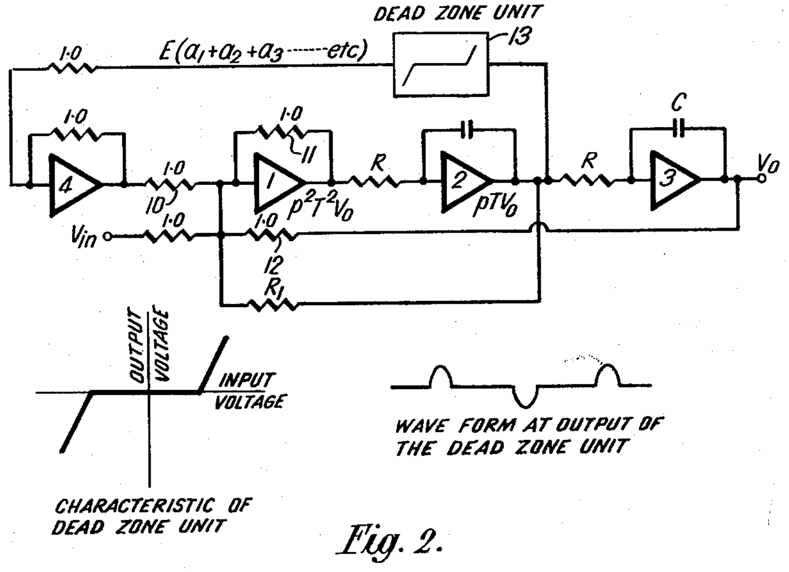
Figure 3:
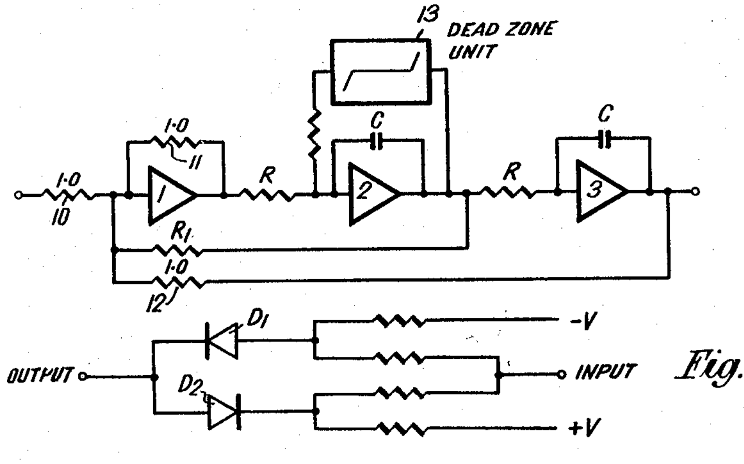
Figure 4:
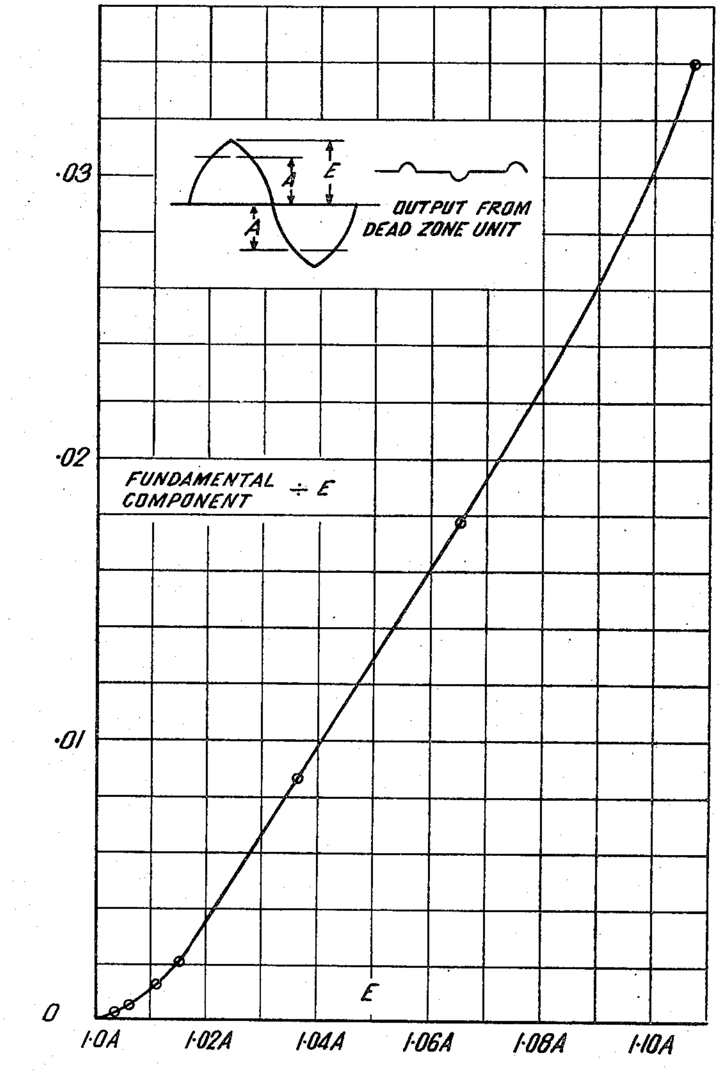
Figure 5:
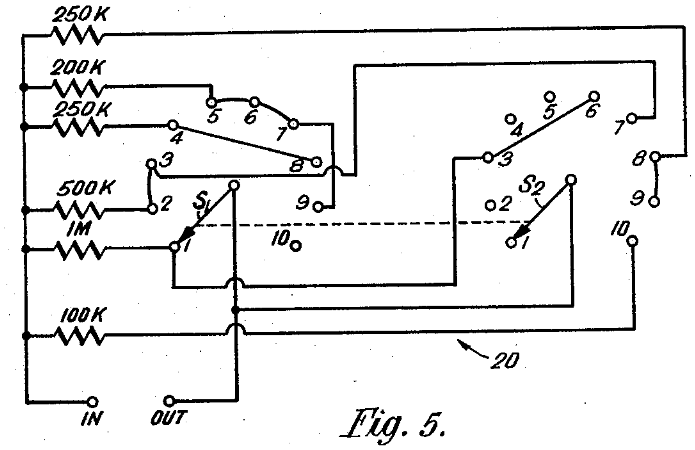
Figure 6:
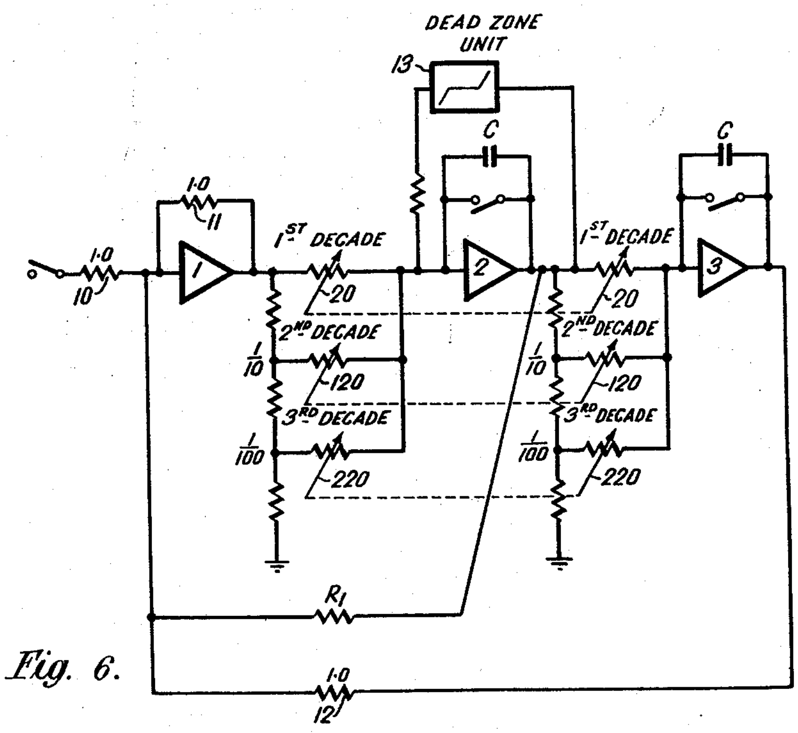

The invention will now be described in greater detail with reference to the accompanying drawings in which:

Fig. 1 is a circuit diagram of the basic oscillator on which the invention constitutes an improvement. Fig. 2 is a circuit diagram of an oscillator according to the invention embodying an amplitude control and shows also the characteristic of the dead zone unit employed and the wave form at the output thereof. Fig. 3 is a circuit diagram of another form of oscillator according to the invention embodying an amplitude control and includes a circuit diagram of the dead zone unit. Fig. 4 is a graph showing the fundamental component from the dead zone unit, Fig. 5 is a circuit diagram of a decade switching arrangement, and Fig. 6 shows the amplifiers of Fig. 3 equipped with decade switching as indicated in Fig. 5.

Like reference characters indicate like parts throughout the figures.

In the case of the oscillator shown in Fig. 1, 1, 2, and 3 represent the three amplifiers, the input and feedback resistors 10, 11 of the adder 1 are equal so that the gain of the adder 1 is unity, the time constants $T=RC$ of the two integrators 2 and 3 are equal and the gain of each of the three amplifier units is unity at the frequency of oscillation. The sinusoidal outputs of all three amplifiers are equal but different in phase due to the 90° phase shift in each integrator and the sign reversal in each amplifier.

The transfer functions of the integrators 2 and 3 are $$\frac{-1}{pT}$$

Therefore the voltage appearing at the output of amplifier 3 due to the addition of $V_0$ and $V_{in}$ at the grid of amplifier 1 is $$\frac{-1}{p^2T^2}(V_0+V_{in})$$

$$\therefore V_0=\frac{-1}{p^2T^2}(V_0+V_{in})$$

$$V_0(p^2T^2+1)=-V_{in}$$

$$\frac{V_0}{V_{in}}=\frac{-1}{p^2T^2+1}$$

or in response to a sinusoidal input writing $jw$ for $p$ $$\frac{V_0}{V_{in}}=\frac{-1}{1-w^2T^2} \quad (1)$$

which is infinite when $$w=\frac{1}{T}$$

Oscillation can therefore be maintained at this frequency. The response to any other frequency $w$ is:

$$\frac{V_0}{V_{in}}=\frac{-1}{1-\left(\frac{w}{Wo}\right)2}$$

Where $W_0$ is the angular frequency of resonance and equal to $$\frac{1}{T}$$

If the feedback resistor 12 between the output of the integrator 3 and the input of the adder 1 is made $R_a$ megohms instead of 1 megohm, it can be shown that $$\frac{V_0}{V_{in}}=\frac{-1}{\frac{1}{R_a}-w^2T^2}$$

which is infinite when $$w=\frac{1}{\sqrt{R_a}T}$$

For A.C. signals of angular frequency $w$, the gain of each integrator is $$\frac{1}{wT}$$

so that at the frequency of resonance the integrator gains are each $\sqrt{R_a}$ and the amplitudes of the outputs of the three amplifiers will differ.

The oscillator shown in Fig. 1 should maintain at constant amplitude and at a frequency determined by the time constant T of the integrators any oscillation started in the circuit. It is well known however that because of leakage in the capacitors and phase shifts in the amplifiers there will be some damping, either negative or positive, in the circuit causing the amplitude of oscillation to grow or decay.

A method of overcoming this difficulty by providing an amplitude control is shown in Fig. 2. In the circuit shiwn in Fig. 2, there are four amplifiers, i.e. two adders 4, 1 and two integrators 2, 3 and a negative damping term is provided by the resistor $R_1$ connecting the output of the amplifier 2 with the input of the amplifier 1. This by itself would cause the amplitude of oscillation to grow very slowly but to counteract this tendency, positive damping is also provided through a dead zone unit 13 having the characteristics shown in Fig. 2 and which is effective only when the amplitude of oscillation exceeds the amplitude determined by the voltage A (see Fig. 4) of the dead zone. The waveform fed back is the positive and negative peaks of the sine wave as shown in Fig. 2 and the proportion of the sine wave fed back and effective in providing damping is the fundamental component amplitude of this waveform expressed as a ratio of the amplitude of the sine wave appearing at the output of amplifier 2.

In the steady state when the amplitudes of oscillation is constant, the amplitude fed back is $E(a_1+a_2+a_3 \ldots)$, where E is the amplitude of oscillation at the output of the amplifier 2 and $a_1$, $a_2$, $a_3 \ldots$ are the amplitudes of the fundamental, second harmonic . . . expressed as fractions of E.

The degree of damping in the circuit may vary due to changes in amplifier gains, capacitor leakage and phase shifts and so the positive damping through the dead zone unit 13 will readjust itself to suit these varying conditions. The readjustment takes the form of a change in amplitude of the sine wave from amplifier 2 so that the fundamental component of the waveform from the dead zone unit 13 once again balances exactly the proportion of amplifier 2 output fed back through $R_1$ and through other leakage paths.

The change in the amplitude of the sine wave from the amplifier 2 demanded by changes of circuit damping is small since the percentage change in fundamental component from the dead zone unit is many times the percentage change in the output of the amplifier 2. For example, if the circuit operates under conditions such that the peak output voltage E from amplifier 2 is 1.04 times the dead zone voltage A the fundamental component from the dead zone unit is .01 times the output of the amplifier 2 as shown in Fig. 4. If the ouput voltage E of the amplifier 2 increases in amplitude by 1% to approximately 1.05 times the dead zone voltage A the fundamental component increases to approximately .0125 times E which is 25% increase.

Since $$\frac{-1}{pT}$$

is the transfer function of each integrator and $V_0$ is the output of amplifier 3 in Fig. 2, the output of amplifier 2 is $-pTV_0$ and the output of amplifier 1 is $p^2T^2V_0$.

The voltages added at the input of amplifier 1 to produce $V_0$ at the output are $$V_0+V_{in}+pTV_0\,a_1-pTV_0\frac{1}{R_1}$$

$a_1$ is, as above noted, the amplitude of the fundamental in the output of the dead zone unit expressed as a fraction of the amplitude E of the sine wave at the output of the amplifier 2. Therefore $a_1pTV_0$ can be considered as being the voltage fed back from amplifier 2 to amplifier 4. The harmonics $a_2$, $a_3$ etc., can be added later to $V_{in}$ to calculate the distortion which they introduce.

$$p^2T^2V_0+pTV_0\left(a_1-\frac{1}{R_1}\right)+V_0=-V_{in}$$

$$\frac{V_0}{V_{in}}=\frac{-1}{p^2T^2+pT\left(a_1-\frac{1}{R_1}\right)+1}$$

If $a_1$ equals $$\frac{1}{R_1}$$

the damping is completely removed and the circuit will oscillate at constant amplitude.

In practice the circuit may be simplified. In Fig. 2 the output of the dead zone unit 13 is fed back to amplifier 4 but it could, with equal effect, be fed back to the grid of amplifier 2 thus rendering amplifier 4 redundant. This modification is shown in Fig. 3 which also shows the circuit of the dead zone unit 13 which includes two biased diodes $D_1$, $D_2$.

The total harmonic distortion caused by the amplitude correcting circuit is of the order of 0.5%. The oscillator according to the invention has an output substantially free from distortion and D.C. drift and which remains constant in amplitude over long periods. The frequency range, in the embodiment described, is .01 to 100 c.p.s.

As already mentioned, if the time constants of the two integrators are both equal to T, the angular frequency of oscillation in the circuit will be $$w=\frac{1}{T}\text{ where } T=RC$$

For a fixed value of C the frequency of oscillation will be proportional to $$\frac{1}{R}$$

The frequency of oscillation may however, be varied by altering the values of the input resistors R of the integrators 2 and 3 by a decade switch 20 (Fig. 5) so arranged that the reciprocal of the resistance can be switched in decade fashion, i.e. if R is the resistance in circuit in position 1 of the10 positon switch; R/2; R/3, R/4 etc., will be the resistances selected in positions 2, 3, 4 and so on. This is done, as shown in Fig. 5, by a switch comprising 2 ganged arms $S_1$, $S_2$ each movable over a bank of 10 contacts wired to the resistances indicated. Fig. 5 shows the case where R=1 M.ohm, and the resistances in positions 1, 2, 3, 4 . . . , are 1 M.ohm, ½ M.ohm, ⅓ M.ohm, ¼ M.ohm . . . . It will be noted that the required ten reciprocal resistance values are obtained using six resistors only, all of readily available values.

As shown in Fig. 6, the values of input resistors to each of the integrators 2 and 3 are determined by first, second and third decade switches 20, 120, 220 of the kind shown in Fig. 5. As already indicated the first decade switch is one in which, in the first position, the value R of the input resistors is 1 M.ohm. The second decade switch 120 requires to be one in which R=10 M.ohms, i.e. in position 1, 2, 3, 4 . . . , the resistances selected are $$10\text{ M.ohms}, \frac{10}{2}\text{ M.ohms}, \frac{10}{3}\text{ M.ohms}, \frac{10}{4}\text{ M.ohms} \ldots$$

and the third decade switch 220 requires R to be 100 M.ohms. The three switches 20, 120, 220 are wired in parallel so that if, for example, 735 is selected the actual resistance in circuit is $$\frac{1}{7}\text{ M.ohm}, \frac{10}{3}\text{ M.ohms, and } \frac{100}{5}\text{ M.ohms}$$

all in parallel giving the desired total of $$\frac{1}{7.35}\text{ M.ohms}$$

The high values of resistances required in the second and third decade switches 120, 220 present some difficulty since resistors of this value are not reliable. The difficulty can be overcome by making the three decade switches identical and connecting the second and third decade switches 120, 220 to $$\frac{1}{10}\text{ and }\frac{1}{100}$$

voltage dividers at the outputs of the amplifiers 1 and 2 as shown in Fig. 6.

What I claim as my invention and desire to secure by Letters Patent is:

1. A low frequency oscillator circuit comprising a forward path including first and second integrator circuits connected in tandum, the output of the first integrator circuit being connected to the input of the second integrator circuit, a feed-back path forming part of the oscillator loop circuit, a second feed-back path connecting the ouput of one of the integrator circuits to an input in the forward path preceding the said one of the integrator circuits to provide negative damping, and a third feed-back path including a dead zone unit and connecting the output of one of the integrator circuits through the dead zone unit to an input in the forward path preceding the last-mentioned one of the integrator circuits to provide positive damping, said dead zone unit passing current only when the amplitude of oscillation applied thereto exceeds a given value.

2. A low frequency oscillator circuit comprising a forward path including a summing amplifier and first and second integrator circuits connected in tandum, the output of the summing amplifier being connected to the input of the first integrator circuit and the output of the first integrator circuit being connected to the input of the second integrator circuit, a feed-back path forming part of the oscillator loop circuit, a second feed-back path connecting the output of one of the integrator circuits to an input in the forward path preceding the said one of the integrator circuits to provide negative damping, and a third feedback path including a dead zone unit and connecting the output of one of the integrator circuits through the dead zone unit to an input in the forward path preceding the last-mentioned one of the integrator circuits to provide positive damping, said dead zone unit passing current only when the amplitude of oscillation applied thereto exceeds a given value.

3. An oscillator circuit according to claim 2, wherein the third feed-back path includes a further summing amplifier connecting the output of the dead zone unit to the input of the first summing amplifier.

4. A low frequency oscillator circuit comprising a forward path including a summing amplifier and first and second integrator circuits connected in tandum, the output of the summing amplifier being connected to the input of the first integrator circuit and the output of the first integrator circuit being connected to the input of the second integrator circuit, a feed-back path forming part of the oscillator loop circuit, a second feed-back path connecting the output of the first integrator to the input of the summing amplifier to provide negative damping, and a third feedback path including a dead zone unit and connecting the output of the first integrator circuit through the dead zone unit to the input of said first integrator circuit to provide positive damping, said dead zone unit passing current only when the amplitude of oscillation applied thereto exceeds a given value.

5. An oscillator circuit according to claim 4, wherein said second feed-back path connects the output of the first integrator circuit to the input of said first summing amplifier.

6. A low frequency oscillator circuit comprising a forward path including first and second integrator circuits connected in tandem, the output of the first integrator circuit being connected to the input of the second integrator circuit, a feed-back path forming part of the oscillator loop circuit, a second feed-back path connecting the output of one of the integrator circuits to an input in the forward path preceding the said one of the integrator circuits to provide negative damping, and a third feed-back path including a dead zone unit and connecting the output of one of the integrator circuits to an input in the forward path preceding the last-mentioned one of the integrator circuits, said dead zone unit comprising two diodes so connected in parallel between the input and output of the unit and so poled and biassed as to transmit only signal excursions exceeding predetermined magnitudes on each side of a datum level.

7. An oscillator circuit according to claim 1, wherein the inputs to the first and second integrator circuits include series-connected variable resistance devices for varying the frequency of oscillation of the oscillator circuit.

8. An oscillator circuit according to claim 7, wherein each variable resistance device comprises a ten-position switch and a plurality of fixed-value resistors for selective connection in circuit by means of said switch.

9. An oscillator circuit according to claim 8, wherein each variable resistance device comprises six fixed-value resistors and switch means selectively connecting said resistors in circuit to obtain ten reciprocal resistance values.

10. An oscillator circuit according to claim 7, wherein the variable-resistance device comprises a decade switch having two sets of ten input terminals and a common output terminal, contact means for selectively connecting the output terminal to each input terminal of the first set and simultaneously to the corresponding input terminal of the second set, a common input terminal, a 100 unit resistor connected between the common input terminal and the tenth input terminal of the second set, a 1,000 unit resistor connected between the common input terminal and the first input terminal of the first set, a 500 unit resistor connected between the common input terminal and the second input terminal of the first set, a 250 unit resistor connected between the common input terminal and the fourth input terminal of the first set, a 200 unit resistor connected between the common input terminal and the fifth terminal of the first set, a 250 unit resistor connected between the common input terminal and the eight terminal of the second set, means connecting the second and third input terminals, the fourth and eighth input terminals and the fifth, sixth, seventh and ninth input terminals of the first set, means connecting the third and sixth input terminals and the eighth and ninth input terminals of the second set, means connecting the first terminal of the first set to the third terminal of the second set, and means connecting the third terminal of the first set to the seventh terminal of the second set.

11. An oscillator circuit according to claim 10, comprising a plurality of said decade switches connected in parallel to provide reciprocal resistance values in different decades.

12. An oscillator circuit according to claim 11, wherein the decade switches provide identical resistance values and are connected to voltage dividers so as to yield reciprocal values in different decades.

13. An oscillator circuit according to claim 12, wherein the variable-resistance devices are ganged for simultaneous adjustment.

14. An oscillator circuit according to claim 10, wherein the contact means of the decade switches of the two variable-resistance devices are ganged together for simultaneous operation.

References Cited in the file of this patent

FOREIGN PATENTS 781,374 Great Britain ------------ Aug. 21, 1957

OTHER REFERENCES

"A Two-Phase Low-Frequency Osc.," by E. F. Good. Part I, pages 164–169, April 1957, part 2, pages 210–213, May 1957. Both in Electronic Engineering.